Figure 1:
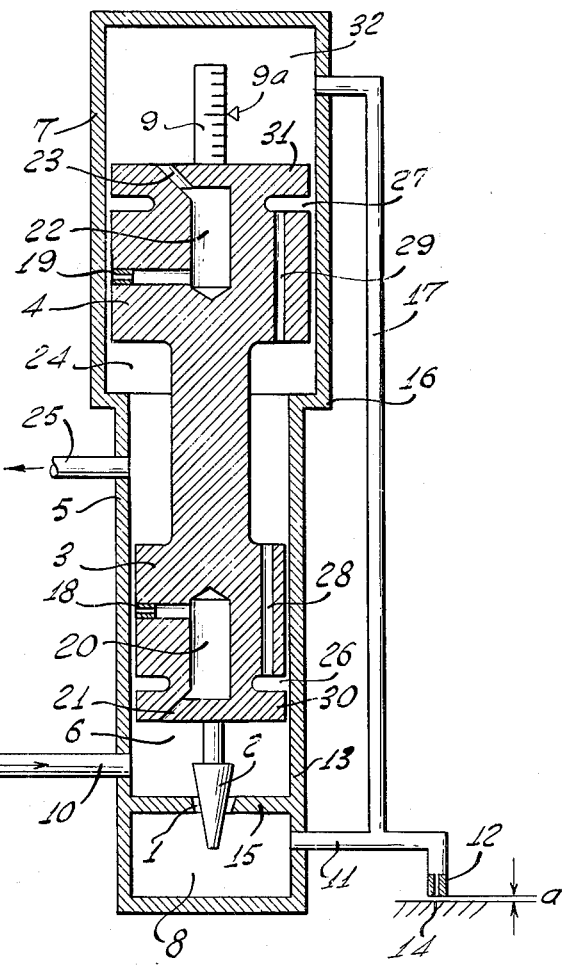

INVENTORS
RUDOLF LEHMANN
ARTHUR WIEMER
HEINZ VOIGT

United States Patent Office 2,981,094
Patented Apr. 25, 1961

2,981,094

PNEUMATIC INSTRUMENT FOR LINEAR MEASUREMENT

Rudolf Lehmann, Berlin-Grunau, Arthur Wiemer, Schulzendorf, Teltow, and Heinz Voigt, Berlin-Lichtenberg, Germany, assignors to Deutsche Akademie der Wissenschaften zu Berlin, Berlin-Odlershof, Germany Filed July 24, 1958, Ser. No. 750,645

Claims priority, application Germany July 29, 1957

7 Claims. (Cl. 73—37.5)

The present invention relates in general to pneumatic instruments for linear measurements and more particularly to a pneumatic instrument for linear measurement including apparatus for maintaining a constant difference in pressure across an internal nozzle system, and using indications of the variations in positioning of such apparatus to indicate variations in linear distances from a discharging measuring nozzle and an external surface arranged in the path of discharge.

In the known pneumatic measuring instruments a measuring nozzle is generally placed in the vicinity of a surface for measuring the distance between the nozzle and surface. Air, or some other gas, is emitted from the nozzle, and the distance between the nozzle and the surface is measured very accurately by various methods. Depending on the distance between surface and nozzle, a lesser or greater amount of gas is emitted from the measuring nozzle, because the resistance to the flow of gas out of the measuring nozzle will correspondingly be greater or smaller. One method therefore, for the measurement of this distance between surface and nozzle would be to accurately measure variations in volume with variations in volume with a flowmeter. A second method would be to measure variations in internal pressure by connecting a second nozzle between the measuring nozzle and a source of pressurized gas. It is then possible to measure the pressure which develops between the measuring nozzle and the nozzle connected in front of the measuring nozzle. The various pressures indicated in the connecting line by a pressure gauge or similar means between these two nozzles will indicate distances between the measuring nozzle and a surface.

In the case of using variations of internal pressure for indicating linear measurements as described above, the pressure range in which a linear relationship exists between the pressure employed in the pneumatic instrument and the distance to be measured is quite narrow. Since the limits of the linear relationship determine the extent to which such a device can be used for measuring linear distances, the limits of the measuring scale are consequently also reduced. The pressures employed in such a device vary from 0.05 atmosphere (in excess of atmospheric pressure) to approximately 4 atmospheres (in excess of atmospheric pressure). When small pressures are applied to the instrument, the flow velocity of the gas stream developed in the nozzle is below the critical value (below the De Laval velocity). When high pressures are applied to the instrument on the other hand, the flow velocity of the stream of gas emitted from the nozzle may be about, or below, the critical value depending on the working characteristics of the instrument. Furthermore, these values may change during the operation of the instrument. When the flow velocity is below the critical value, the flow volume is in part very strongly dependent on the pressure drop and also on the shape of the nozzle. The shape, type of surface and diameter of the nozzle are all factors which strongly influence the linear relationship between the distance to be measured and the pressure applied to the instrument. Therefore, a special scale must be applied to the instrument for each particular type of nozzle used therein.

In the case of the flowmeter type of pneumatic measuring instruments described above, the pressure drop in the measuring nozzle remains constant. Furthermore, by using a sufficiently high supply pressure in such a device it is possible to obtain a flow velocity through the measuring nozzle which is always above the critical value. Consequently, linear relationship is maintained in a larger range than in the device that uses variations in internal pressure.

The flowmeter type of pneumatic instrument, however, has the disadvantage that the measuring accuracy is dependent on the density and the temperature of the gas flowing though the instrument.

It is a general object of the present invention to provide an improved pneumatic linear measuring device which overcomes the above described disadvantages.

It is a further, more specific object of the present invention to maintain the pressure drop in the nozzles of such a pneumatic instrument for making linear measurement sufficiently large, so that the flow velocity through the nozzles is maintained above the critical value.

With the above objects in view, the invention mainly consists of a pneumatic instrument for linear measurement (see distance "$a$" in the drawing), comprising in combination, a container including an automatically adjustable head nozzle therein, a measuring nozzle connected to the container at an outlet end thereof, a source of a pressurized gas connected to the container at an inlet end thereof, adjusting means pneumatically connected to the outlet and inlet ends for keeping the pressure drop of the air or gas flowing through the pneumatic instrument constant, and indicating means for indicating the linear measurement between the measuring nozzle and a surface, the indicating means being connected to the adjusting means so as to move jointly therewith, whereby distances between the measuring nozzle and a surface will be indicated by the indicating means.

Figure 2:
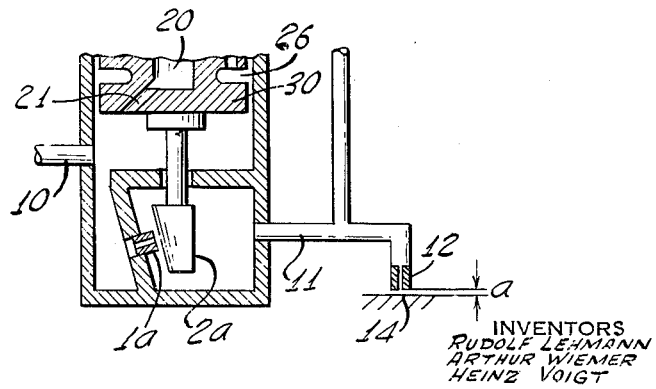

Fig. 1 is a schematic transverse sectional view of a pneumatic linear measuring device constructed in accordance with the invention, and showing one type of head nozzle; and Fig. 2 is a similar view of a measuring device in accordance with the invention, with utilizing a head nozzle of slightly different construction.

A more specific description of the device shown indicates a container 13 which is divided by a partition 15 into an upper chamber or compartment 6 and lower compartment 8. Through an inlet pipe 10 pressurized gas is applied to the container. An outlet pipe 11 permits the pressurized gas to leave the container and leads the gas to a measuring nozzle 12. An orifice or nozzle 1 hereinafter called "head nozzle" is positioned in the division wall and permits flow therethrough from the upper compartment 6 to the lower compartment 8. In accordance with the invention a constant pressure drop is maintained across the head nozzle 1 by a pneumatic balancing valve mechanism including a needle valve 2 which is movable into and out of the nozzle. The needle valve 2 is guided by two interconnected vertically reciprocable pistons 3 and 4 located on one side of the head nozzle and connected to the needle valve 2. Similar results may be obtained by having the two pistons 3 and 4 connected to a sliding mechanism $2a$ which moves across the opening $1a$ of Fig. 2. The piston 3 is of slightly smaller diameter than the piston 4. Piston 3 reciprocates in a cylinder 5 which is of slightly larger diameter than the piston. The cylinder 5 is integrally connected to the container and is in pneumatic communication with chamber 6. The larger piston 4 reciprocates in a cylinder 7 which is of slightly larger diameter than piston 4, and is made integral with cylinder 5 and with the container by a wall portion 16. By the end face of piston 4, a chamber 32 is formed in cylinder 7, which chamber is pneumatically connected to the lower chamber 8 of the container by a tube 17. The piston heads of pistons 3 and 4 are respectively actuated by the gas pressures in chambers 6 and 8. Pistons 3 and 4 are connected to each other. Piston 4 is also connected at its other end to a scale 9 with indicator 9a. Pistons 3 and 4 move slidingly and jointly in their respective cylinders and actuate thereby the needle valve 2 and the scale 9 relative to the indicating means 9a. The cross-sectional areas of pistons 3 and 4 are inversely proportional to the respective absolute pressures in chambers 6 and 8. The arrangement is such that the needle 2 will move in and out of the aperture of the nozzle 1, when the back pressure in the measuring nozzle changes, to keep the pressure drop across the nozzle constant and the flow velocity therethrough above the critical value.

Hence when the measuring instrument is fed with a gas of constant and adequately high pressure, the pressure drop of the gas entering the head nozzle and leaving the measuring nozzle 12 remains constant and independent of a distance "a" between the measuring nozzle 12 and a surface 14. Furthermore, this arrangement permits the flow velocity of a gas through the nozzles to remain higher than its critical value.

Variations of the distance "a," between the nozzle 12 and the surface 14, is indicated by the relative movement of the indicator 9a on the scale 9, since movement of the indicator relative to the scale is directly related to change in pressure within the system. By properly choosing the scale 9 the distance "a" may be directly indicated thereon. When this distance "a" is increased the resistance to flow through the nozzle 12 is reduced. This causes in turn an instantaneous reduction in pressure in cylinder 7 and chamber 8 whereby the pistons 3 and 4 together with the needle valve 2 move upwardly to increase the flow through the nozzle 1. In this manner the system is balanced and the pressure drop across the measuring instrument is kept constant. The movement of the pistons 3 and 4 is indicated on the scale 9 and gives a direct indication of the new distance "a."

The instrument may be used for various purposes. The forces which the pistons can produce are only limited by the size of these pistons and of course the magnitude of the pressure in the gas source P; therefore, the instrument may be used over wide pressure ranges.

The pistons or cylinders can be provided with axial grooves 26, 27, 28 and 29. These grooves would permit some of the gas to escape from the container during the operation of the device. The escaping gas acts like a lubricant and consequently facilitates the sliding movement of pistons 3 and 4 through the cylinders containing these pistons. This reduction of friction is desirable to insure the accuracy of the device.

An illustration of this type of friction reduction is likewise given in the drawing. Piston 3 is provided with a chamber 20 which communicates with chamber 6 by a passage 21 through which it receives air from the supply pipe 10. The air escapes through opening 18 into the space between the piston and the wall of cylinder 5. Similarly, piston 4 has a chamber 22 communicating through bore 23 with chamber 32 which contains air under the same pressure as chamber 8. From chamber 22 air escapes through opening 19 into the space between the piston and wall of cylinder 7. The air between the pistons 3 and 4 and their associated cylinders centers the pistons in up and down travel and provides a mounting therefor which is free of friction and play.

The present invention as described above provides a measuring device in which the cross-sectional area of the available flow space is adjusted by a pneumatic balancing device so that the pressure drop remains constant in the head and measuring nozzles. Hence the pressure drop in applicants' device will always be independent from the measurement indicated by the indicating means because the pressure drop is always sufficient to provide a sufficiently high flow velocity of gas (above the critical value) in both nozzles.

It will be understood that each of the elements described above, or two or more together, may also find useful application in other types of pneumatic instruments for linear measurements, differing from the types described above.

While the invention has been illustrated and described as embodied in a pneumatic device for linear measurements, it is not intended to be limited to the details shown in the drawing, since various modifications and structural changes may be made, without departing in any way from the spirit of the present invention.

Also structural elements may be combined with the disclosure such as tightening, thrust, plotting or computing means so that the invention may be used for other than measuring purposes without changing in any way the essential meaning of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. A pneumatic instrument for linear measurements connected to a measuring nozzle at its outlet and a source of pressurized gas at its inlet, for measuring distances between said measuring nozzle and a surface, comprising in combination, a container, a partition in said container for separating the same into two separate compartments, inlet means for directing gas under pressure to one of said compartments, measuring nozzle means for discharging gas from the other of said compartments, an automatically adjustable head nozzle supported by said partition for passing gas therethrough from one compartment to the other, adjusting means connected to said head nozzle for automatically keeping the pressure drop between said source of pressurized gas and the outlet of said measuring nozzle constant, said adjusting means having a portion in pneumatic communication with one of said compartments and a portion in communication with the other of said compartments, said adjusting means being movable by variations in pressure within said compartments to adjust said head nozzle, and indicating means operatively connected to said adjusting means.

2. A pneumatic instrument for linear measurements as claimed in claim 1, in which the adjacent means comprise a movable conically shaped needle which by moving in and out of the aperture of the nozzle determines the magnitude of available flowing space through which the pressurized gas may flow through said nozzle.

3. A pneumatic instrument according to claim 2, in which the conically shaped needle moves coaxially relative to the aperture.

4. A pneumatic instrument for linear measurements as claimed in claim 1, in which the adjusting means comprise a slider which moves in a substantially normal direction to the axis of the head nozzle across the aperture of said head nozzle and determines thereby the magnitude of available flowing space through which the pressurized gas may flow.

5. A pneumatic instrument for linear measurement as claimed in claim 2, wherein said conically shaped needle is operatively connected to piston means slidingly moving in cylinder means, each end of said piston means being in pneumatic communication with one of said compartments.

6. A pneumatic instrument for linear measurement as claimed in claim 2, wherein a first piston is connected to said conically shaped needle, a first cylinder is integrally connected to said container and provides a guide through which said first piston is slidingly movable, said first cylinder being of slightly larger diameter than said first piston, the piston head of said first piston being in pneumatic communication with the upstream side of said head nozzle and thereby being actuated by the pressurized air at said upstream side, a second piston operatively connected to said first piston for coextensive movement therewith, a second cylinder integrally connected to said container and providing a guide through which said second piston is slidingly movable, said second cylinder being of slightly larger diameter than said second piston, the piston head of said second cylinder being in pneumatic communication with the downstream side of said head nozzle and thereby being actuated by the pressurized air at said downstream side, the respective cross-sectional areas of said first piston and said second piston being inversely proportional to the respective pressurized gas pressures at said upstream and downstream sides, so that when said conically shaped needle is automatically moving in and out of said nozzle, the pressure drop of said pressurized gas remains constant when said gas is flowing through said pneumatic instrument.

7. A pneumatic instrument for linear measurements as claimed in claim 6, wherein flow channels are located in said first and second pistons for facilitating the escape flow of pressurized gas therethrough and passages are provided between said pistons and the walls of the cylinders wherein said pistons are moving for facilitating thereby the sliding movement of said first and second pistons, in said cylinders.

References Cited in the file of this patent

UNITED STATES PATENTS

| | | |
|---|---|---|
| 2,478,391 | Segerstad | Aug. 9, 1949 |
| 2,669,246 | Segerstad | Feb. 16, 1954 |

UNITED STATES PATENT OFFICE
CERTIFICATE OF CORRECTION atent No. 2,981,094                      April 25, 1961

Rudolf Lehmann et al.

It is hereby certified that error appears in the above numbered patent requiring correction and that the said Letters Patent should read as corrected below.

Column 4, line 57, for "adjacent" read -- adjusting --.

Signed and sealed this 17th day of October 1961.

(SEAL)
Attest:

ERNEST W. SWIDER                      DAVID L. LADD
Attesting Officer                        Commissioner of Patents

USCOMM-DC